United States Patent
Wei et al.

(10) Patent No.: US 9,598,843 B2
(45) Date of Patent: Mar. 21, 2017

(54) REAL-TIME ROUTE TERRAIN VALIDITY CHECKER

(71) Applicant: Caterpillar Inc., Peoria, IL (US)

(72) Inventors: Mo Wei, Dunlap, IL (US); Michael Taylor, Peoria, IL (US); Thandava Edara, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 54 days.

(21) Appl. No.: 14/571,728

(22) Filed: Dec. 16, 2014

(65) Prior Publication Data

US 2016/0170411 A1    Jun. 16, 2016

(51) Int. Cl.

| | |
|---|---|
| *G05D 1/00* | (2006.01) |
| *E02F 9/26* | (2006.01) |
| *E02F 9/20* | (2006.01) |
| *G05D 1/02* | (2006.01) |

(52) U.S. Cl.
CPC .............. *E02F 9/261* (2013.01); *E02F 9/205* (2013.01); *E02F 9/2054* (2013.01); *G05D 1/0214* (2013.01); *G05D 2201/021* (2013.01)

(58) Field of Classification Search
None
See application file for complete search history.

(56) References Cited

U.S. PATENT DOCUMENTS

| | | | |
|---|---|---|---|
| 5,787,378 A | * | 7/1998 | Schricker ................ F16H 61/12 340/438 |
| 8,290,701 B2 | | 10/2012 | Mason et al. |
| 8,345,926 B2 | | 1/2013 | Clark et al. |
| 8,639,393 B2 | | 1/2014 | Taylor et al. |
| 2008/0208415 A1 | * | 8/2008 | Vik .......................... E21C 41/26 701/50 |
| 2010/0106356 A1 | * | 4/2010 | Trepagnier ............ G01S 17/023 701/25 |
| 2012/0083969 A1 | * | 4/2012 | Greiner ................ G06Q 10/047 701/31.4 |
| 2012/0136508 A1 | * | 5/2012 | Taylor ................... E02F 9/2045 701/2 |

* cited by examiner

*Primary Examiner* — John R Olszewski
*Assistant Examiner* — James M McPherson
(74) *Attorney, Agent, or Firm* — Miller, Matthias & Hull

(57) ABSTRACT

Automated excavating uses automated dozers and other earthmoving equipment to move material at a worksite. When such equipment is required to avoid a temporary obstruction, traverse between work slots, or traverse between work areas, a controller uses information from real-time sensors and contour maps to determine a new route to the destination. The controller also determines in real time whether the proposed route will keep the equipment on terrain with slopes that do not exceed a slope limit set for the mobile excavation machine. If not, the controller re-routes the machine to a new path over terrain with acceptable slopes.

20 Claims, 8 Drawing Sheets

REAL-TIME ROUTE TERRAIN VALIDITY CHECKER

TECHNICAL FIELD

The present disclosure relates to control of automated excavation machines, particularly real-time avoidance of adverse terrain and transient obstacles.

BACKGROUND

Some worksites, particularly mining operations, use automated machines, such as dozers, to move earth in a prescribed manner. The current practice is to manually move a dozer, or other machine into position for work at what is termed a slot. The initial contour of the slot is known from surveys and the ending contour of the slot is set by design. The machine is then turned over to automated control and runs under computer control until the desired ending contour is achieved.

U.S. Pat. No. 8,639,393 ('393) discloses a control system for operating an automated excavation machine that uses machine location and blade position to execute an excavation plan for a slot in a worksite. Once positioned, the automated excavation machine operates forward and backwards, with slight side-to-side repositioning generally less than the width of a work tool of the machine. Machines operating in accordance with '393 patent only work on a pre-planned basis for particular slots in an area with any hazards already accounted for. Real-time control is limited to earthmoving tasks only.

The '393 patent fails to disclose an automated system for avoiding terrain and other obstacles while repositioning machines outside a current slot including real-time analysis of en route terrain or unexpected obstacles.

SUMMARY OF THE DISCLOSURE

In one aspect of the disclosure, a method of routing mobile excavation machines at a worksite includes operating a mobile excavation machine to autonomously move material in a predefined slot at a work area. The method may continue by setting a route for the mobile excavation machine completely outside the predefined slot for relocation of the mobile excavation machine and then automatically analyzing a terrain contour of the route and then automatically determining that a terrain contour of the route exceeds an acceptable operating state for the mobile excavation machine. The method may conclude by automatically altering a travel path of the mobile excavation machine to a new route that avoids the terrain contour that exceeds the acceptable operating state.

In another aspect of the disclosure, a system for routing mobile excavation machines at a worksite includes a mobile excavation machine equipped with remote control equipment that allows remotely controlled steering, speed and direction control, a controller configured to communicate with the mobile excavation machine to receive location information about the mobile excavation machine and to provide remote control instructions to the mobile excavation machine. The system may also include a planner coupled to the controller. The planner may be configured for programming the mobile excavation machine for autonomous operation for moving material in a slot of a work area, setting a destination for the mobile excavation machine outside the slot using a route, analyzing a terrain contour along the route, and determining when the route intersects an unacceptable terrain contour. The planner may also be configured for setting an intermediate destination for the mobile excavation machine that causes the mobile excavation machine to avoid the unacceptable terrain contour.

In yet another aspect of the disclosure, a method of routing a mobile excavation machine operated by remote control at a worksite may include autonomously operating the mobile excavation machine to move material in a predefined slot, setting an initial route for the mobile excavation machine to autonomously travel outside the predefined slot to a new work area, segmenting the route into a plurality of piecewise linear segments, and performing a terrain validation of a terrain of a next closest segment of the plurality of piecewise linear segments. The method may also include determining that the terrain of the route exceeds an acceptable operating state for the mobile excavation machine and altering a travel path of the mobile excavation machine to a new route allows the mobile excavation machine to autonomously travel to the new work area and avoid the terrain of the initial route that exceeds the acceptable operating state.

DETAILED DESCRIPTION

Mining and other earthmoving-related operations are increasingly using automated mobile excavation machines to cut contours and move earth either out of the way or to a loading or processing area. Current machines operate on a slot basis where the terrain is validated based on a slope of the terrain in a straight line in the predetermined slot. Terrain validation involves checking both a side-to-side slope and fore-and-aft slope of a potential slot and compare the slopes to the acceptable operating limits for the particular piece of equipment being used. In this environment mobile excavation machines are manually driven to a new slot or a new work area within the worksite.

Because the exact route between old and new slot may not be known ahead of time, attempts to use the current technology for automatically transitioning machines to new work areas fall short because the mobile excavation machine must be out of the slot for which the terrain has been prequalified as within its operating limits. Therefore, terrain validation for the new route must be performed to ensure that the new route also does not include any unacceptable terrain.

Further, while operating in a known slot, pop-up (e.g., non-mapped structures) or transient objects (e.g., trucks and other mobile excavation machines) can be kept away from active slots. However, while relocating a mobile excavation machine without an operator from one work area to another these pop-up and transient objects must be accounted for. Because collision avoidance may cause a change in a route, the terrain validation of the new route must be repeated.

Figure 1:
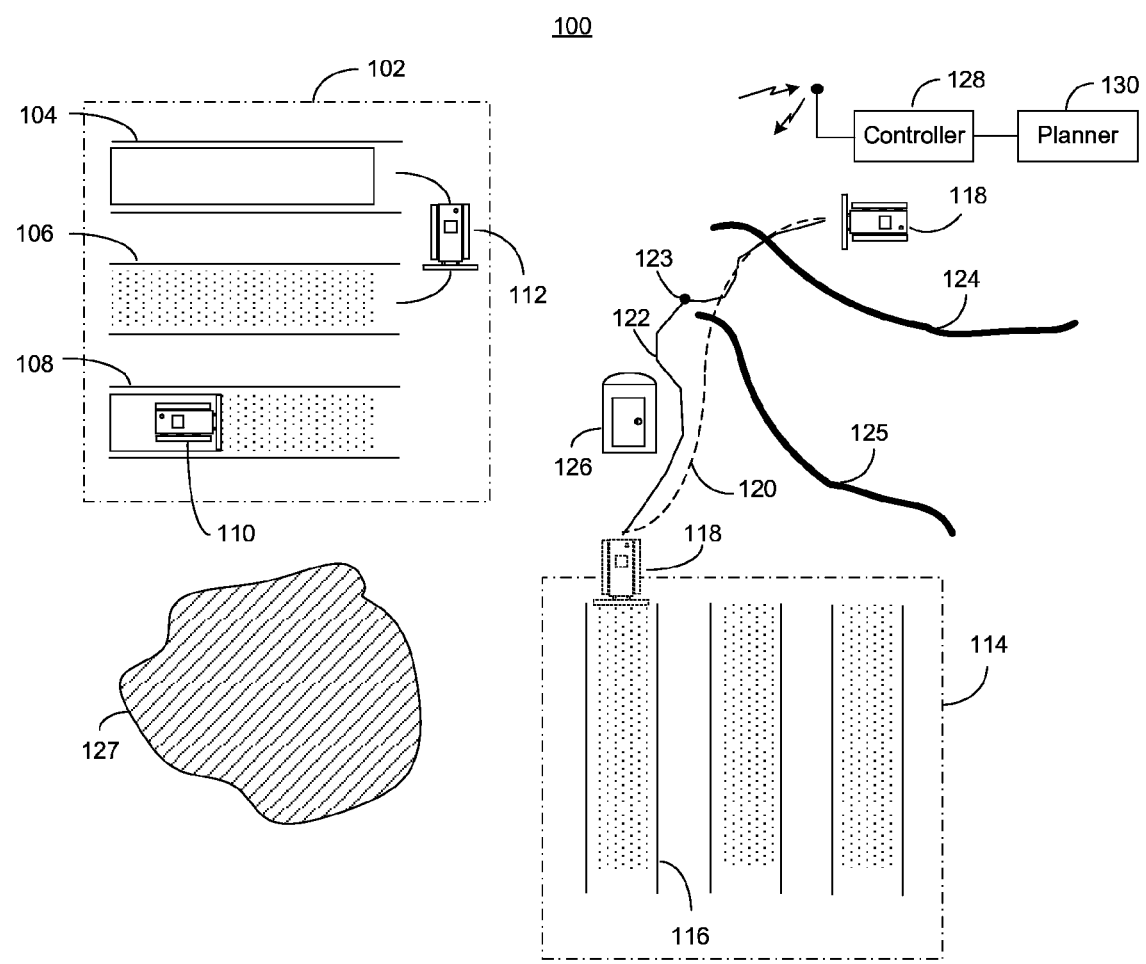
FIG. 1 is a plan view of a worksite.

FIG. 1 is a plan view representing an overhead map of a worksite 100. The worksite 100 may include a first work area 102 and a second work area 114. The first work area 102 may include slots 104, 106, 108. In an exemplary embodiment, a mobile excavation machine 110 may be remotely operated in its pre-assigned slot 108. Another mobile excavation machine 112 is illustrated as being in transit between slot 104 and slot 106. The worksite 100 may include one or more off-limit zones 127.

FIG. 1 further illustrates transition of a mobile excavation machine 118 to the second work area 114 for use in a slot 116. An initial route 120 may be selected for the mobile excavation machine 118 simply as the shortest distance to the endpoint that avoids any known obstacles or off-limit zones shown on the map. The initial route 120 may be a straight line, but the techniques disclosed are equally applicable to curved lines, as illustrated. As described in more detail below, breaking up the initial route 120 into piecewise linear sections and performing a terrain validation on each segment shows that the mobile excavation machine 118 will encounter a first contour 124 and a second contour 125. For the sake of example, terrain validation of successive piecewise linear sections are assumed to show that the first contour 124 is acceptable and may be traversed while the second contour 125 exceeds the acceptable rating for slope of the mobile excavation machine 118. A modified route 122 with an intermediate destination 123 must be generated so that the machine 118 may avoid the terrain with the unacceptable slope. The path of the mobile excavation machine 118 along the modified route 122 now involves a pop-up structure so that the modified route 122 must again be modified. While collision avoidance is ongoing, the terrain validation may be repeated for each piecewise linear section of the modified route 122 until the machine 118 reaches its destination slot 116.

In an embodiment, a controller 128 and planner 130 may cooperate to communicate with stations in the field, including the mobile excavation machines 110, 112, 118, to analyze operations, perform terrain validation, select routes, and control these remotely operated machines. The controller 128 and planner 130 are discussed in more detail below. In some embodiments, the controller 128 and planner 130 may execute on the same computing platform. In other embodiments, the functions of the controller 128 and/or planner 130 may be split differently including being embedded in individual mobile excavation machines.

Figure 2:
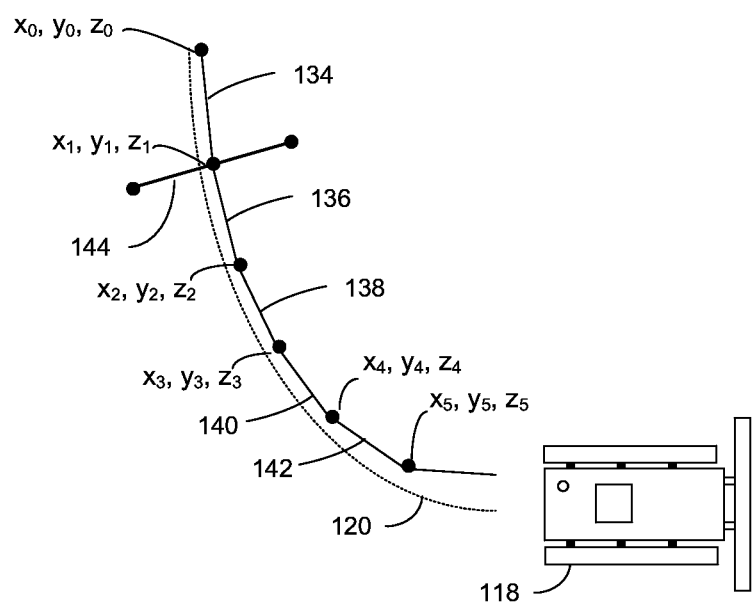
FIG. 2 shows a detail of a route that illustrates terrain validation.

FIG. 2 illustrates route segmentation and a configuration for transient collision avoidance as may take place at the worksite 100. FIG. 2 illustrates a portion of the initial route 120 for mobile excavation machine 118 of FIG. 1 and how the initial route 120 may be segmented for terrain validation. The initial route 120 may be broken up into piecewise linear segments 134, 136, 138, 140, 142 (the segment depictions are offset for the sake of clarity). The endpoints of each piecewise linear segment may be identified by coordinates (x, y) that are either globally located with latitude and longitude or locally located using offsets from a known point on the worksite 100. The elevation of each endpoint is indicated using the z-axis parameter. Again, the elevation may be globally referenced (e.g., to sea level) or locally referenced to a known point at the worksite. The segment 134 has endpoints $(x_0, y_0, z_0)$ and $(x_1, y_1, x_1)$. The segment 136 has endpoints $(x_1, y_1, z_1)$ and $(x_2, y_2, z_2)$ and segment 138 has endpoints $(x_2, y_2, z_2)$ and $(x_3, y_3, z_3)$, etc. Each endpoint may be considered a waypoint in the initial route 120 or a modified route 122. In an embodiment, the piecewise linear segments 134, 136, 138, 140, 142 may be selected to be about the length of the mobile excavation machine 118 in that most mobile excavation machines can turn within their own length. In other embodiments, the piecewise linear segments may be one meter or less. Other implementations can use other lengths of the piecewise linear segments.

Any piecewise linear segment may be compared to a map of the worksite with topology information to determine the terrain gradient or slope for that segment. These calculations may be performed for a next or other future piecewise linear segment in real time as the mobile excavation machine 118 traverses a previous segment. Several variations of terrain validation are contemplated as discussed below. Generally, the slope of any piecewise linear segment 134, 136, 138, 140, 142 represents a fore-and-aft slope of the mobile excavation machine 118. Additionally, an orthogonal segment 144 may be evaluated to give a side-to-side slope of the initial route 120 or any alternate route 122. The orthogonal segment 149 may be placed at an endpoint of a segment or may be placed at an interior of a segment. The length of the orthogonal segment may be set to a distance approximately equal to a width of the mobile excavation machine 118, although other lengths may be used. For example, a longer length of orthogonal segment 149 may be used to provide a safety margin for terrain validation.

In one embodiment, the slope used for terrain validation between two endpoints (or waypoints) may be calculated as simply an elevation change divided by the distance between the endpoints, so that for any segment the slope is calculated as:

$$(z_1-z_0)/((x_1,y_1)-(x_0,y_0)).$$

For clarity, the distance between endpoints may be shortened to Distance (0, 1). The equation may be shortened further to simply "Slope endpoint a, endpoint b", so that the previous equation would read:

$$(z_1-z_0)/(\text{Distance } (0,1). \text{ Slope } [0,1]$$

In other embodiments, the slope determination may be more forward focused, encompassing two, three, or more segments in one calculation. For example, an evaluation of a either a curved or a straight line route may use $$(z_2-z_0)/((\text{Distance } (0,1)+\text{Distance } (1,2)). \text{ Slope } [0,1,2]$$

Another alternative, depending on the size of the mobile excavation machine 112 and the length of the segment, may be to calculate an expanded range such as:

$$(z_2-z_0)/(\text{Distance } (0,2). \text{ Slope } [0,2]$$

That is the distance is $(x_2, y_2)-(x_0,y_0)$, ignoring the intermediate endpoint.

In some embodiments, each of the above calculations may be performed for any combination of to-be-traversed segments. If any of the calculated slope values exceeds the acceptable operating slope for the mobile excavation machine 112, the proposed route will be canceled and a new route calculated.

To state this concept more generally, an arbitrary number of segments may be selected for evaluation. To illustrate using five endpoints, the following combinations may be evaluated. Again, any slope exceeding the acceptable operating state may cause cancellation of the route and cause a new route to be generated:

Slope [0,1],Slope [1,2],Slope [2,3],Slope [3,4]
Slope [0,1,2],Slope [1,2,3],Slope [2,3,4]
Slope [0,1,2,3],Slope [1,2,3,4]
Slope [0,1,2,3,4]
Slope [0,2],Slope [1,3],Slope [2,4]
Slope [0,3],Slope [1,4]
Slope [0,4]

However, each calculation result may not be compared to the same acceptable operating threshold value. In general, the acceptable operating slope is higher over shorter distances and for larger mobile excavation machines. For example, high slopes over short distances may not be problem for a big mobile excavation machine 112. That is, an 80% slope over one meter may be acceptable while a 50% slope over 4 meters may be unacceptable. Exact slope acceptable operating states are known for each type of mobile excavation machine.

Figure 3:
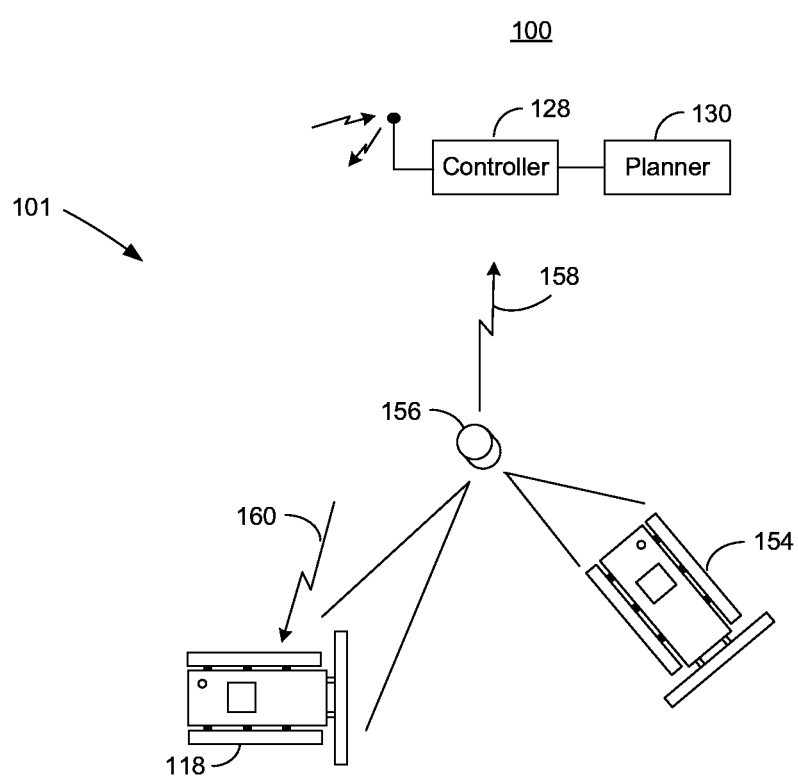
FIG. 3 illustrates route segmentation and a configuration for transient object collision avoidance.

Leaving slope calculations, FIG. 3 illustrates one system configuration to handle collision avoidance. A sensor 156 is located at the worksite 100 and has the ability to sense mobile excavation machines, fixed structures, and pop-up obstacles in multiple directions. The sensor 156 may include one or more cameras, optical sensors, radar, wireless transponders, etc. In one embodiment, the sensor 156 may detect when the mobile excavation machine 118 is on course to collide with another mobile excavation machine 154 and send a signal 158 to the controller 128 to take action. In another embodiment, the sensor 156 may send raw data to the controller 128 for processing by the controller 128 or the planner 130 to determine when a collision is possible. The controller 128 may then send a message via wireless link 160 to the mobile excavation machine 118 to stop or alter course and/or speed. The collision avoidance capability of the controller 128 and planner 130 may extend to all mobile machines at the worksite 100.

Taken together, the controller 128, planner 130, one or more mobile excavation machines 118, and optionally, sensors 156 make up a system 101 for routing mobile excavation machines.

Figure 4:
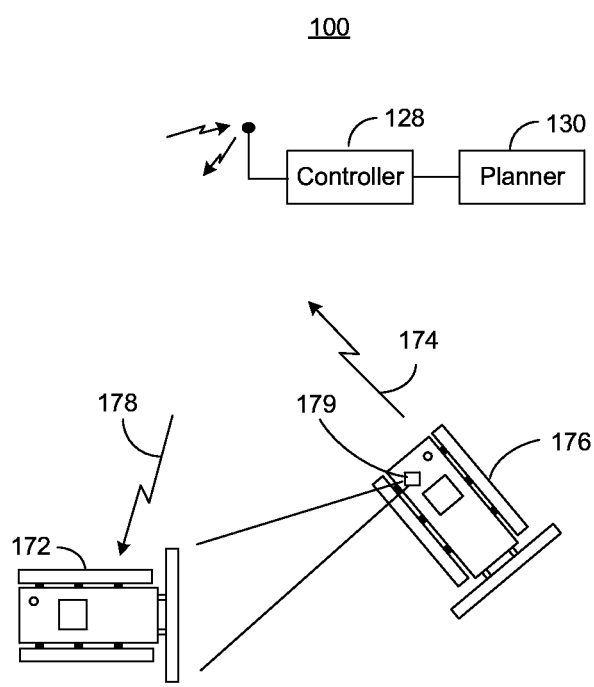
FIG. 4 illustrates another configuration for transient object collision avoidance.

FIG. 4 illustrates another system configuration for transient collision avoidance. In this embodiment, another machine 176, such as another mobile excavation machine has a sensor 179 that reports either the presence of a mobile excavation machine 172 or raw sensor data to the controller 128 via wireless link 174. The controller 128, potentially in conjunction with the planner 130, evaluates the threat and if real then sends an instruction to the mobile excavation machine 172 to stop or alter course and/or speed.

Figure 5:
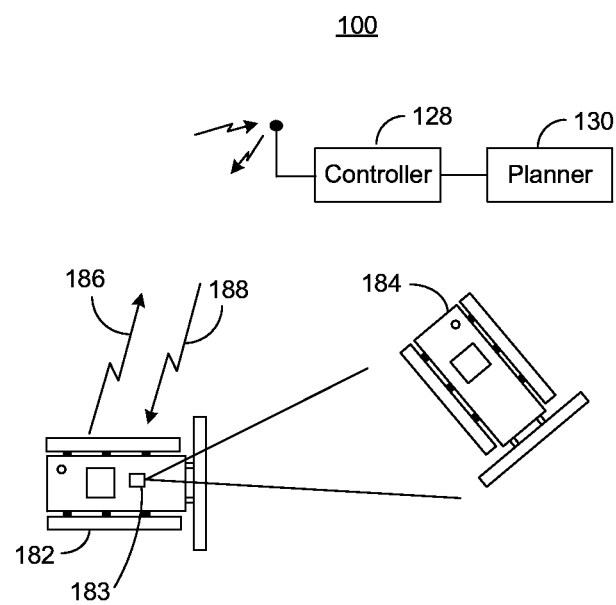
FIG. 5 illustrates a third configuration for transient object collision avoidance.

FIG. 5 illustrates a third configuration for transient collision avoidance. In this configuration, a mobile excavation machine 182 may have a sensor 183 that is used to detect pop-up obstacles or other machines, such as mobile excavation machine 184 either by directly interpreting the sensor data and requesting instructions via wireless link 186 or by sending the raw sensor data to the controller 128 via the wireless link 186. In either case, when warranted the controller 128, optionally in conjunction with the planner 130, may send an instruction to the mobile excavation machine 182 to stop or alter course and/or speed. In some embodiments, instructions for collision avoidance may be sent to both mobile excavation machines 182 and 184.

Figure 6:
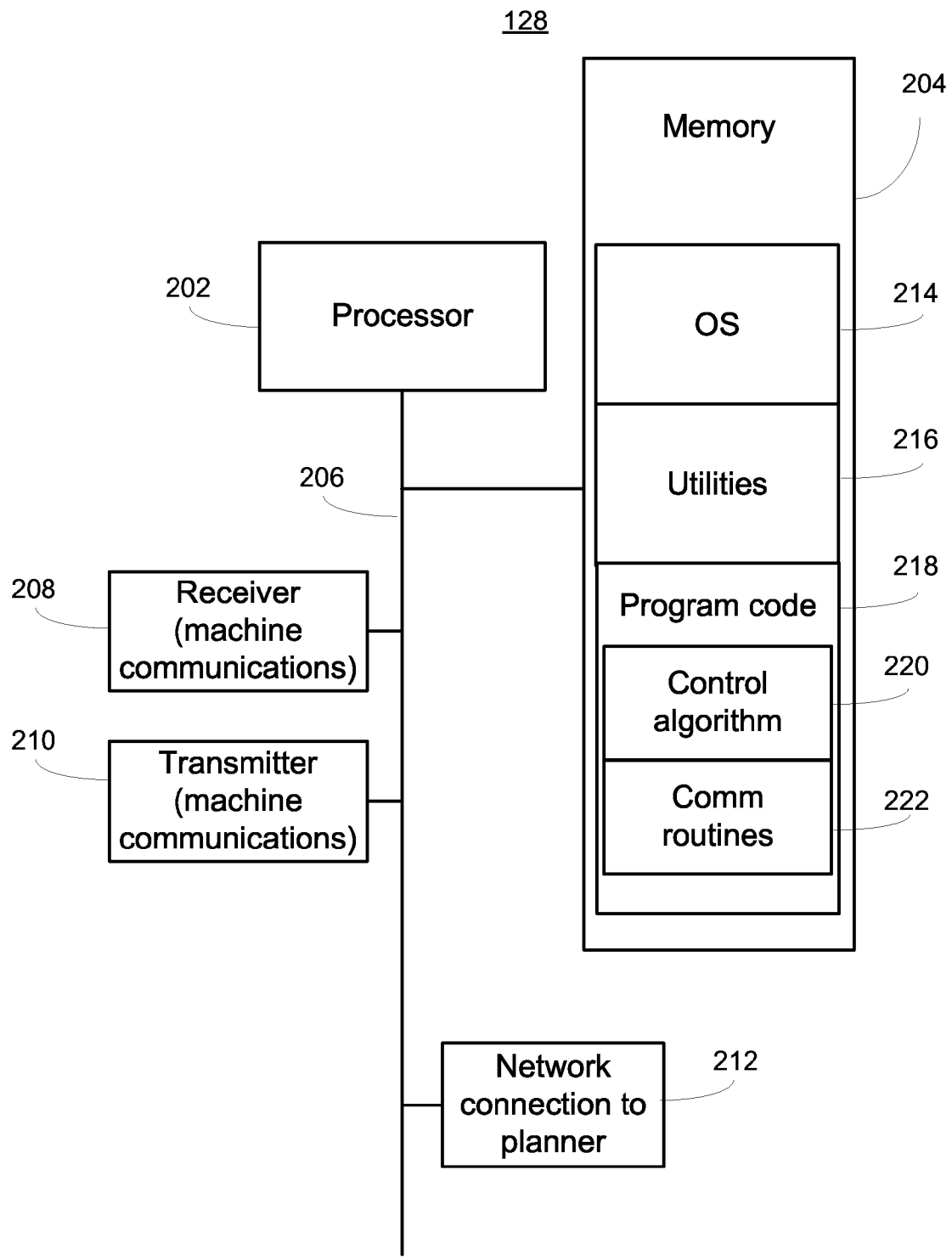
FIG. 6 is a block diagram of an exemplary controller for use in an automated mobile excavation machine control system.

FIG. 6 is a block diagram of an exemplary controller 128 for use in an automated mobile excavation machine control system. The controller 128 may include a processor 202 and a memory 204 coupled by a data bus 206. The controller 128 may also include a receiver 208 and a transmitter 210. The receiver 208 may receive information about the location of a mobile excavation machine 118 and/or raw or processed sensor data from one or more sensors 156, 179, 183. Location information may be received from location system, such as GPS on mobile excavation machine 118 or from other site monitoring equipment, such as sensor 156.

The transmitter 210 may send control instructions used to operate the mobile excavation machine 118 as well as other mobile excavation machines 110, 112, etc. The control instructions may include travel path, direction, speed, gear, and work tool settings, such as blade height.

The controller 128 may also include a network connection 212 for communication with a planner 130. The functions of the planner 130 are discussed in more detail below. The memory 204 may include an operating system 214 and various utilities 216 that support, for example, set up and diagnostics. The memory 204 may also include program code 218 that may include modules such as control algorithms 220 and communication routines 222. Control algorithms 220 may include specific operating information about various models of mobile excavation machines and instructions on specific control instructions required to cause desired actions at the mobile excavation machine 118. The communication routines 222 may be used to convert the control instructions into specific protocols for use with particular machines and/or different wireless communication systems.

Figure 7:
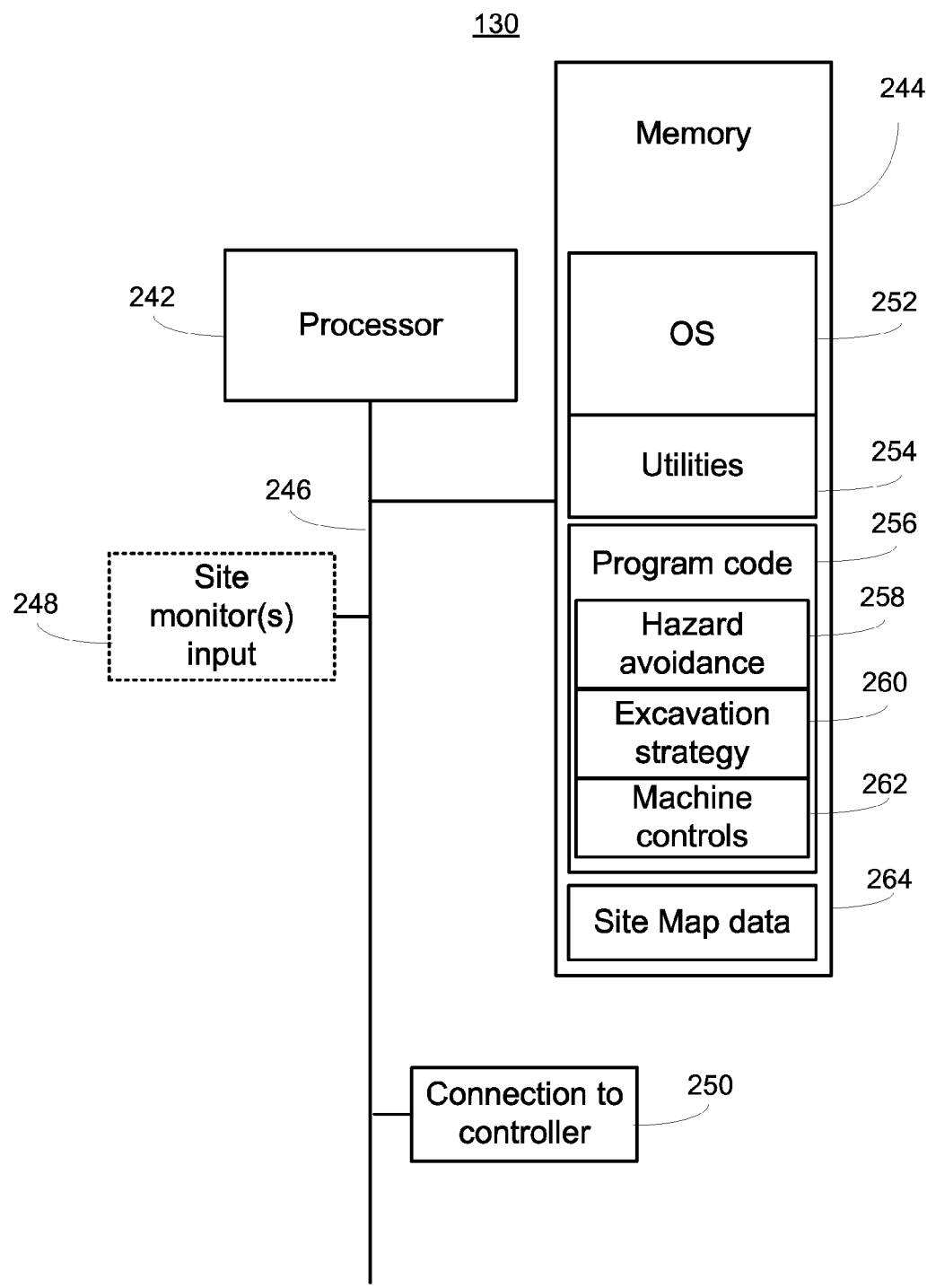
FIG. 7 is a block diagram of an exemplary planner for use in an automated mobile excavation machine control system.

FIG. 7 is a block diagram of an exemplary planner 130 for use in an automated mobile excavation machine control system. Similar to the controller 128, the planner 130 may include a processor 242 and a memory 244 coupled by a data bus 246. The planner 130 may include a site monitor input 248 that receives information from sensors 156, 179, or 183 when that information is not received directly by the controller 128. The planner 130 may also include a network connection 250 for exchanging data with the controller 128.

The memory 244 may include an operating system 252 and utilities 254, as above, that may be used, for example, for set up and diagnostics. The memory 244 may also include program code 256 including modules for hazard avoidance 258, excavation strategies 260, and machine control strategies 262. The hazard avoidance program code 258 may include algorithms for performing terrain validation, discussed in more detail below.

The memory 244 may also include data such as site map data 264 with worksite information including locations of work areas 102 and 114, terrain information, structures, and off-limit zones for use in formulating initial routes 120 as well as modified routes 122 and for performing real-time terrain validation.

INDUSTRIAL APPLICABILITY

Figure 8:
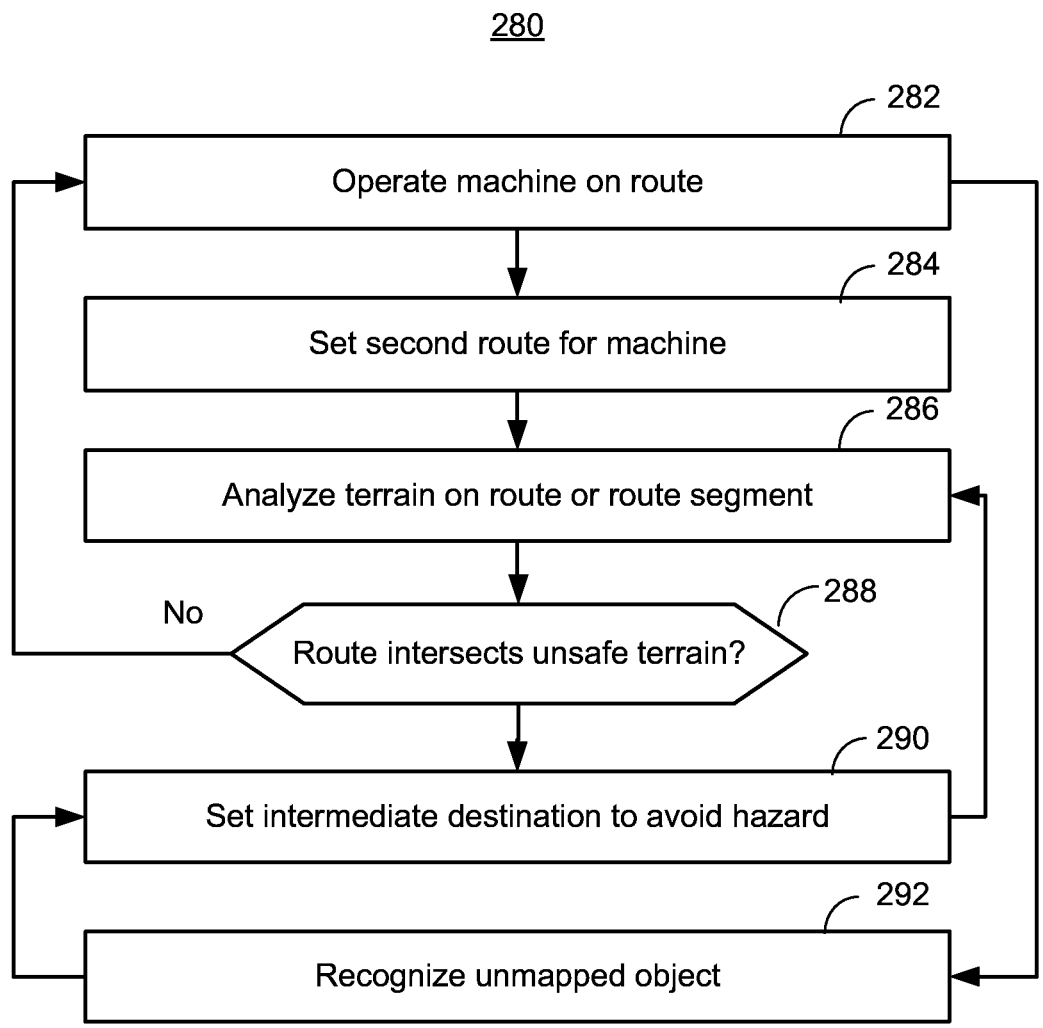
FIG. 8 is a flowchart of an exemplary method of managing real-time routing and collision avoidance.

FIG. 8 is a flowchart of an exemplary method 280 of managing real-time routing and collision avoidance. At a block 282, a mobile excavation machine 118 may be autonomously operated on a route to move material at a work area. The mobile excavation machine 118 may For example, the mobile excavation machine 118 may be operated in a slot 104 that has been prequalified for terrain validity. That is, it is known prior to operating in the slot 104 that the mobile excavation machine 118 will be operated at an acceptable operating state for slope based on characteristics of the particular machine 118. At a block 284, a second route may be set in order to cause the mobile excavation machine 118 to transit outside of the original slot 104. This transit may be from one slot 104 to another slot 106, from a first work area 102 to a second work area 114 or to another location such as a maintenance area.

At a block 286, the initial route 120 may be analyzed according to a terrain validation plan to determine if any unacceptable terrain lies in the path of the planned route. In an embodiment, the initial route 120 may be divided into piecewise linear segments, such as segments 134, 136, and 138 illustrated in FIG. 2. In this embodiment, the terrain validation is applied only to an immediately upcoming piecewise linear segment. For example, if a mobile excavation machine 118 is currently occupying segment 134 a terrain validation may be performed on segment 136. Or as discussed above, more forward looking terrain validation or terrain validation on more complex combinations of route segments may also be performed.

The terrain validation may be accomplished automatically without human operator intervention in any of a number of forms. For example in one embodiment, endpoints of the segment being analyzed may be geo-located on a worksite contour map including contour lines reflecting areas of constant elevation. The number of contour lines traversed between the endpoints of the piecewise linear segment will reflect the elevation change indicating slope for that segment. In another exemplary embodiment discussed in detail above, the endpoints may be located in three-dimensional space $(x_1, y_1, z_1)$ and $(x_2, y_2, z_2)$ and one or more combinations of route segments may be used in the terrain validation of slope. Similarly, a side-to-side slope may be calculated at an orthogonal segment 144 along any segment. In yet another embodiment, an area within a radius about an endpoint $(x_1, y_1, z_1)$ may be evaluated to determine a maximum slope in any direction within the area and the maximum slope used for terrain validation against a slope rating for the mobile excavation machine 118. Other terrain validation techniques may also be used.

At block 288, if the planned or initial route 120 or a corresponding piecewise linear segment, e.g., segment 134 does not cross any unacceptable terrain the 'no' branch may be taken to block 282 and the machine 118 may continue on the initial route 120. If at block 288 the route does intersect unacceptable terrain execution may continue at block 290. At block 290, the mobile excavation machine 118 may receive directions to change course with a new route to an intermediate destination that avoids this hazard which in this case is in the form of the unacceptable terrain. In embodiments where controller and planning functions are distributed, the new route may be locally generated at the machine 118. Many route planning algorithms exist, such as a least cost algorithm that can determine a new direction that avoids the unacceptable terrain and minimizes travel distance to the ultimate destination.

At any time, for example responsive to an interrupt, execution may be diverted to block 292. At block 292, an obstacle may be identified. The obstacle may be a permanent structure not found on a map of the worksite 100, a temporary structure, another machine either in motion or stopped, or even a person. Execution may continue at block 290 where, responsive to instructions from the controller 128, the mobile excavation machine 118 may either be stopped by effectively setting its destination to its current location or by simply issuing a command to stop. Alternatively, the controller 128 may instruct the mobile excavation machine 118 to alter its course to avoid the hazard which in this case is in the form of an obstacle.

As above, any change in course for the mobile excavation machine 118 requires that execution continue at block 286 so that terrain validation may be performed on the new route.

The ability to dramatically expand the capability of remotely controlled mobile excavation machines 110, 112, 118 at a worksite 100 significantly impacts the efficiency and cost associated with these automated tasks. By allowing mobile excavation machines 118 to automatically transit outside of preassigned work slots 104, 106 provides significant new flexibility in deploying valuable machines while reducing the number of human operators required to oversee activity at the worksite 100.

What is claimed is:

1. A method of routing mobile excavation machines at a worksite comprising:
   operating a mobile excavation machine to autonomously move material in a predefined slot at a work area;
   setting a route completely outside the predefined slot for relocation of the mobile excavation machine to a new slot at the worksite;
   automatically analyzing a terrain contour of the route;
   automatically determining that the terrain contour of the route exceeds an acceptable operating state for the mobile excavation machine; and
   automatically altering a travel path of the mobile excavation machine to a new route that avoids the terrain contour that exceeds the acceptable operating state, the new route including a path to the new slot that avoids the terrain contour that exceeds the acceptable operating state.

2. The method of claim 1, wherein setting the route for the mobile excavation machine comprises:
   sensing an obstruction in a current travel path of the mobile excavation machine;
   determining a new travel path that avoids the obstruction; and
   setting the route based on the new travel path.

3. The method of claim 2, wherein sensing the obstruction comprises determining a transient object is in the current travel path of the mobile excavation machine using one of an optical sensor and radar.

4. The method of claim 3, wherein the sensing the obstruction occurs at one of the mobile excavation machine, another machine, and a fixed monitor site.

5. The method of claim 1, wherein setting the route for the mobile excavation machine comprises:
   receiving a signal indicating the mobile excavation machine should move to a new area; and
   determining the route as a course between a current location of the mobile excavation machine and the new area.

6. The method of claim 1, wherein analyzing the terrain contour of the route comprises:
   segmenting the route into a plurality of piecewise linear segments; and
   performing a terrain validation for each segment of the plurality of piecewise linear segments.

7. The method of claim 6, wherein performing the terrain validation for each segment of the plurality of piecewise linear segments comprises:
   selecting a subset of adjacent segments of the plurality of piecewise linear segments;
   performing a slope calculation using a combined distance between respective endpoints of the adjacent segments and an elevation change between an initial endpoint and a final endpoint of a last segment of the subset of adjacent segments; and validating the terrain when each calculated slope is within an acceptable value of slope.

8. The method of claim 6, wherein performing the terrain validation for each segment of the plurality of piecewise linear segments comprises:

selecting a subset of adjacent segments of the plurality of piecewise linear segments;

performing a separate slope calculation over a plurality of consecutive segments using a direct distance between a first endpoint of a first segment and a final endpoint of a final segment of the plurality of piecewise linear segments and an elevation change between an initial endpoint of the first segment and a final endpoint of the final segment of the subset of adjacent segments; and validating the terrain when each calculated slope is within an acceptable value of slope.

9. The method of claim 1, wherein analyzing the terrain contour of the route comprises:

segmenting the route into a plurality of piecewise linear segments; and performing a terrain validation to a next segment of the plurality of piecewise linear segments to be encountered by the mobile excavation machine.

10. The method of claim 1, wherein the acceptable operating state is a function of fore-and-aft slope and side-to-side slope.

11. The method of claim 1, wherein the acceptable operating state is a function of an off-limit zone of a site map.

12. The method of claim 1, further comprising:

setting the new route as the route for the mobile excavation machine; and repeating the analyzing the terrain contour, determining that the terrain contour exceeds the acceptable operating state, and altering the travel path steps for the new route.

13. A system for routing mobile excavation machines at a worksite comprising:

a mobile excavation machine equipped with remote control equipment that allows remotely controlled steering, speed, and direction control;

a controller configured to communicate with the mobile excavation machine to receive location information about the mobile excavation machine and provide remote control instructions to the mobile excavation machine; and a planner coupled to the controller, the planner configured for:

controlling the mobile excavation machine for autonomous operation for moving material in a first slot of a work area;

setting a destination for the mobile excavation machine outside the first slot using a route, the destination associated with a second slot;

analyzing a terrain contour along the route;

determining when the route intersects an unacceptable terrain contour;

setting an intermediate destination for the mobile excavation machine that causes the mobile excavation machine to avoid the unacceptable terrain contour as the mobile excavation machine travels to the destination associated with the second slot.

14. The system of claim 13, wherein setting the destination for the mobile excavation machine comprises the planner is further configured for:

recognizing a transient object in a path of the mobile excavation machine; and causing the controller to alter a direction of the mobile excavation machine to avoid the transient object.

15. The system of claim 13, wherein analyzing the terrain contour comprises:

comparing the route to a contour map of the worksite along the route to determine whether a terrain slope is in excess of an acceptable operating slope for the mobile excavation machine.

16. The system of claim 15, wherein the controller is further configured for dividing the route into linear intermediate waypoints, wherein comparing the route to the contour map comprises comparing a route segment between a current location and a first waypoint with the contour map.

17. The system of claim 15, wherein the contour map further includes exclusion zones prohibited from passage by the mobile excavation machine.

18. A method of routing a mobile excavation machine operated by remote control at a worksite, the method comprising:

autonomously operating the mobile excavation machine to move material in a predefined slot;

setting an initial route for the mobile excavation machine to autonomously travel outside the predefined slot to a new slot at the worksite;

segmenting the initial route into a plurality of piecewise linear segments;

performing a terrain validation of a terrain of a next closest segment of the plurality of piecewise linear segments;

determining that a terrain of the route exceeds an acceptable operating state for the mobile excavation machine;

altering a travel path of the mobile excavation machine to a new route that allows the mobile excavation machine to autonomously travel to the new slot and avoid the terrain of the initial route that exceeds the acceptable operating state, the new route including a path to the new slot that avoids the terrain of the initial route that exceeds the acceptable operating state.

19. The method of claim 18, further comprising:

sensing an obstruction in a current travel path of the mobile excavation machine using one of an optical sensor and radar;

determining a new travel path that avoids the obstruction; and setting the route based on the new travel path.

20. The method of claim 18, wherein each of the plurality of piecewise linear segments is approximately equal to a length of the mobile excavation machine.

* * * * *